United States Patent
Waterman et al.

[15] 3,674,756

[45] July 4, 1972

[54] COPOLYMERIZATION OF ALLYL FLUORIDE

[72] Inventors: Jacques Abraham Waterman; Ilan Shaham; Leonard M. Shorr, all of Haifa, Israel

[73] Assignee: Israel Mining Industries-Institute for Research and Development, Haifa Bay (near Ir Ganim) Haifa, Israel

[22] Filed: Dec. 20, 1968

[21] Appl. No.: 786,549

[30] Foreign Application Priority Data

Feb. 1, 1968    Israel ........................................29406

[52] U.S. Cl. ..................260/80.81, 204/159.23, 260/87.1, 260/87.5 A
[51] Int. Cl. ....................C08f 1/60, C08f 15/06, C08f 15/24
[58] Field of Search ....................260/87.5, 92.1, 80.81, 87.1

[56] References Cited

UNITED STATES PATENTS

| | | | |
|---|---|---|---|
| 3,524,839 | 8/1970 | Margulis | 260/92.1 |
| 2,471,959 | 5/1949 | Hunt | 260/89.5 |

OTHER PUBLICATIONS

Allyl Chloride, Technical Publication SC: 49– 8 (by Shell Chem. Corp.), pp. 74– 75 (1949).

*Primary Examiner*—Joseph L. Schofer
*Assistant Examiner*—C. A. Henderson, Jr.
*Attorney*—Browdy and Neimark

[57] ABSTRACT

Copolymerization of allyl fluoride at a temperature not exceeding 55° C in the presence of a catalyst of the free radical donor type.

3 Claims, No Drawings

COPOLYMERIZATION OF ALLYL FLUORIDE

The present invention concerns the copolymerization of allyl fluoride. In the context of this specification and the appended Claims the copolymerization of allyl fluoride is to be understood as signifying polymerization with one or more different monomers.

Attempts that have so far been reported to polymerize or copolymerize allyl fluoride have mostly been unsuccessful. Thus S. Murahashi, S. Nozakura and K. Hatada report in Bull Chem. Soc. Japan 34, 631 (1961) that attempts to polymerize allyl fluoride using Ziegler type catalysts were unsuccessful, the fluorine in the product being only from 1 to 3 percent instead of the theoretical content of 31.6 percent. Also infra-red spectra indicated the highly unsaturated structure of the products obtained resulting from the dehydrofluorination which occurred.

Moreover, in U.S. Pat. Specification No. 2,486,923 there is described in two-stage process in which allyl chloride is at first polymerized in the presence of a peroxide serving as initiator and is then further polymerized in the presence of hydrogen fluoride. Towards the end of the second stage, the temperature is raised to above 300° C. It is stated in that patent that the hydrogen fluoride acts as a polymerization catalyst and in addition a substantial amount of HF enters into chemical combination to give a product containing combined fluorine as well as combined chlorine. It is also mentioned in the patent that hydrogen chloride is evolved and this proves the occurrence of a dehydrohalogenation reaction which generally occurs during the polymerization of allyl halide with an ionic-type catalyst. It seems therefore that in the process according to the above U. S. patent the fluorine enters the polymer by subsequent addition of HF at the unsaturation sites. However, such a succession of reactions cannot lead to a true polyallyl structure, since by the addition of HF the fluorine will not always enter the allylic position (according to the Markovnikov rule).

It can thus be positively stated in the process according to U.S. Pat. No. 2,486,923 there does not occur a substitution of fluorine for chlorine during the reaction since HF alone, or even in the presence of a catalyst is unable to replace a lone chlorine atom in primary, secondary or tertiary chloro compounds. In line therewith U.S. Pat. Specification No. 2,486,923 does in fact not describe any compound which might be considered as polymeric or copolymeric allyl fluoride and merely mentions polymers containing combined chlorine and fluorine.

The successful copolymerization of vinyl chloride with allyl fluoride was for the first time reported by S. Margulis et al. in Israel J. Chem. Vol. 5, 1967. According to that disclosure the copolymerization is effected by free radical bulk polymerization at a temperature range of 55°–65° C. However, the molecular weight of the copolymerization obtained at reaction temperatures exceeding 55° C is relatively low.

It has now been found that the copolymerization in bulk can successfully be carried out below 55° C yielding products of improved properties.

In accordance with one aspect of the present invention allyl fluoride is copolymerized at a temperature not exceeding 55° C in the presence of a catalyst of the free radical donor type.

Examples of catalysts that are applicable in accordance with the invention are azo-compounds of the general formula

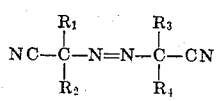

in which $R_1$, $R_2$, $R_3$, and $R_4$ are each a hydrocarbon radical. From among this group, azo-isobutyronitrile, which will be referred to hereinafter for short as AIBN, and whose formula is

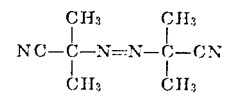

has been found particularly suitable.

Other catalysts that can be applied in accordance with the present invention are peroxides, hydroperoxides, oxygen, carbon halides such as carbon tetrachloride, chloroform, chloroformates, and diazo compounds such as diazomethanes.

The fact that in accordance with the present invention polymerization can be carried out below 55° C is of great technological importance and reflects favorably on the molecular weight and the content of bound allyl fluoride of the final product. Also, the lower the polymerization temperature the less the final polymer is branched. Consequently the product obtained in accordance with the invention has a relatively low degree of branching as compared, for example, with those disclosed by S. Margulis et al., which constitutes yet another advantage of the present invention.

Also, it has been known that various free radical donor type catalysts such as, for example, peroxides and hydroperoxides cannot be employed at temperatures within the range disclosed by S. Margulis et al. (loc. cit.) since within that range they lead only to poor polymerization. It was therefore surprising to find in accordance with the present invention that by lowering the temperature to below 55° C said catalysts lead to a satisfactory polymerization.

In some cases it is advantageous to employ in addition photo-excitation, e.g., with ultraviolet wavelengths of the order of 3,000–5,000 A. In addition, or alternatively, chemical activators such as alkyl derivatives of boron, dialkyl aryl amines, soluble and insoluble transition metal compounds and aluminum halide derivatives can be used. In particular metals which under the prevailing reaction conditions can be transferred reversibly from one valency step to the other, e.g. compounds of copper, iron, manganese, vanadium, titanium, cobalt and nickel are suitable.

In some cases known reductors can be added to give improved yields and rates for the reaction. Examples of these reductors are ascorbic acid, sodium-formaldehydesulfoxylate, glucose, amines, hydroxylamines and hydrazines.

In accordance with an embodiment of the present invention the polymerization is carried out in aqueous dispersion. In this manner the process can be better controlled and a desired molecular weight range is more easily achieved. When the reaction is of the emulsion type the usual emulsifier can be used, e.g. a natural and synthetic anion-active, cation-active, or non-anionic emulsifier. In the case of suspension-type polymerization, suspending agents, protective colloids and stabilizers, chosen from well-known materials, are used.

In accordance with another embodiment of the present invention the polymerization is carried out in an organic solvent. Suitable solvents are methanol and benzene. In the case of methanol, the reaction can be carried out at a low temperature below zero.

The invention is illustrated by the following Examples, to which it is not limited:

EXAMPLE 1

In a glass pressure tube which had been swept with nitrogen, containing 15 ml of an aqueous solution of 1 percent sodium laurate 6.5 g of vinyl chloride, 1 ml of allyl fluoride and 0.01 g of AIBN as catalyst were added.

The mixture was polymerized for 10 hours at 52° C, then cooled and the polymer flocculated by HCl. The polymer was washed with water and ethyl alcohol and dried for 6 hours at 45° C at a pressure of 10 mm Hg. The yield of the product obtained (calculated on the monomer) was 25 percent. The intrinsic viscosity in cyclohexanone at 25° C was 0.70 dcl/g corresponding to a molecular weight of about 55,000.

The amount of bound allyl fluoride in the copolymer was 6 percent by weight.

EXAMPLE 2

Allyl fluoride was copolymerized with vinyl chloride using different proportions of the two monomers. The copolymerization was carried out at 35° C in the presence of 0.65 percent by weight of AIBN. The results are given in the following table.

TABLE 1

| wt.per cent of allyl fluoride in monomer feed | reaction time in hours | intrinsic viscosity in dcl/g at 25°C in cyclohexane (extrapolated at C = 0) | bound allyl fluoride in the copolymer in wt per cent | remarks |
| --- | --- | --- | --- | --- |
| 0 | 17 | 1.75 | 0 | |
| 5 | 66 | 1.50 | 3.5 | |
| 10 | 66 | 1.20 | 6 | |
| 20 | 66 | 0.80 | 9 | |
| 30 | 66 | 0.45 | 14 | sunlight was used to activate the catalyst |
| 40 | 66 | 0.35 | 21 | ditto |

For comparison some experiments on bulk copolymerization of allyl fluoride with vinyl chloride were performed at 65° C in the presence of 0.2 percent of AIBN as catalyst, the reaction time being in each case 6.5 hours. The results of these experiments are given in the following Table II.

TABLE II

| wt per cent allyl fluoride in monomer feed | intrinsic viscosity in dcl/g at 25°C in cyclohexanone at a concentration C = 0 (extrapolated) | approximate molecular weight | bound allyl fluoride in the copolymer % (wt per cent) |
| --- | --- | --- | --- |
| 0 | 0.65 | 50,000 | 0 |
| 5 | 0.50 | 35,000 | 4 |
| 10 | 0.47 | | 6 |
| 20 | 0.35 | | 10 |

By comparing the results given in the two Tables it is seen that the products obtained in accordance with the invention, i.e. at a temperature below 55° C (in this case 35° C) with 5, 10 and 20 percent by weight of allyl fluoride in the monomer feed, are superior to those obtained from the same composition of the monomer feed when the polymerization is carried out at a temperature above 55° C (in this case 65° C). This superiority is expressed in the intrinsic viscosities at 25° C in cyclohexanone which, in accordance with the invention (Table I) were 1.50, 1.52, and 0.80 respectively, while in the other process (Table II) they were 0.50, 0.47, 0.35 respectively, i.e. in each case between one third and half the value. Since the intrinsic viscosity is proportional to the molecular weight the superiority of the products obtained in accordance with the invention is evident.

EXAMPLE 3

In a glass pressure tube which had been swept with nitrogen 8 g of vinyl acetate, 2 g of allyl fluoride and 0.03 g of AIBN were added. The mixture was reacted for 66 hours at 50° C then cooled and the residual monomer distilled off. The residue was a polymer having an intrinsic viscosity of 0.6 dcl/g (in chloroform at 25° C and C = 0 by extra extrapolation) containing 22 percent by weight of bound allyl fluoride.

EXAMPLE 4

Allyl fluoride and vinyl chloride were copolymerized using various different catalysts and the results are given in the following Table III.

TABLE III

| Weight percent allyl fluoride in monomer feed | The catalyst used | Reaction time in hours | Temperature, °C. | Intrinsic viscosity [1] | Bound allyl fluoride [2] |
| --- | --- | --- | --- | --- | --- |
| 10 | 0.2% benzoyl peroxide | 16 | 50 | 0.6 | 6 |
| 10 | 0.6% benzoyl peroxide | 66 | 50 | 0.7 | 7.5 |
| 2 | 3.3 g./l. boron triethyl plus 1 g./l. cumene hydroperoxide. | 10 | −25 | 1.5 | 2 |
| 10 | 10% methanol plus 10% CCl$_4$+0.05% H$_2$O$_2$+ 0.43% H$_2$O+0.0002% Fe$_2$(SO$_4$)$_3$+0.15% ascorbic acid. | 10 | −12 | 1.2 | 6 |
| 10 | 0.6% benzoyl peroxide peroxide plus 2.6% dimethyl-p-toluidine. | 8 | 0 | 1.0 | 6 |

[1] In dcl./g. at 25° C. in cyclohexanol at C=0.
[2] In product, percent.

As can be seen from the above table some of the catalysts permit the performance of the reaction at very low temperature (even below zero) which leads to the formation of products with high molecular weight.

EXAMPLE 5

In a glass pressure tube which had been swept with nitrogen 10 g of a mixture of 9 g vinyl chloride, 1 g of allyl fluoride and 66 mg of AIBN were added. To this mixture 20 ml of methanol which is a solvent for the monomer was added. The mixture was polymerized at 40° C during 66 hours. A polymer was isolated having an intrinsic viscosity of 1.0 (measured in cyclohexanone at 25° C at C = 0 by extrapolation). The polymer obtained contained 6 percent by weight of bound allyl fluoride.

The use of a solvent permits an even and continuous dissipation of the heat which enables a better control of the reaction than in the case of bulk polymerization.

EXAMPLE 6

In a glass pressure tube which had been swept with nitrogen, 8 g vinyl pivalate /C(CH$_3$)$_3$ COOCH = CH$_2$/, 2 g allyl fluoride and 0.03 g of AIBN were added. The mixture was reacted for 66 hours at 50° C then cooled and the non-reacted monomer distilled off with steam. The residue was a polymer having an intrinsic viscosity of 0.53 dcl/g (in chloroform at 25° C and C = 0 by extrapolation) containing 21 percent by weight of bound allyl fluoride.

EXAMPLE 7

In an autoclave, the following reagents were added; 200 g of vinyl acetate, 300 g of tert. butanol (as a solvent), 3 g of AIBN and 25 g of allyl fluoride. Oxygen was removed by repeatedly pressing in nitrogen and, after that, ethylene was introduced into the autoclave to a final pressure of about 200 atm. Next, the mixture was heated to 54° C during a period of 66 hours, after which the non-reacted ethylene and allyl fluoride were removed from the mixture. After cooling the autoclave was opened and the mixture subjected to steam distillation. The polymer obtained was dried at vacuum and was found to contain 30 percent bound vinyl acetate and 4 percent bound allyl fluoride.

EXAMPLE 8

In a glass reactor which had been swept with nitrogen were added 150 g water and 4 g potassium laurate, 0.7 g $Na_3PO_4 \cdot 12H_2O$, 0.1 g sodium-formaldehyde-sulphoxylate, 0.06 g disodium salt of ethylene diamine tetracetic acid, 0.04 g $Fe_2(SO_4)B3 \cdot 7H_2O$. The pH of the aqueous phase was adjusted to 10 with potassium hydroxide. Then 90 g of vinyl chloride and 10 g of allyl fluoride were introduced and finally 0.1 g of cumene hydroperoxide. The mixture was reacted for 6 hours at 1° C. After venting out the unreacted mixture, the polymer was flocculated with acetone. The polymer obtained had an intrinsic viscosity of 1.0 dcl/g in cyclohexanone (at C = 0). The bound allyl fluoride in the copolymer was 7 percent.

EXAMPLE 9

A suspension polymerization was carried out in a magnetically stirred glass pressure tube under a nitrogen atmosphere. The quantities of reactants were, in order of addition:

12.5 ml of a solution of 0.03 g Aerosol —OT in water (= sodium di-octyl sulphosuccinate) + 0.07 g carboxymethyl cellulose (CMC type 12 H) + 0.023 g sodium bicarbonate in 100 ml water.
4 g vinylchloride
1 g allylfluoride
0.0125 g lauroylperoxide
Temperature 52° C.

After 24 hours, the excess monomer was vented off, the solid product was filtered off and washed with water and methanol and dried at 50° C under vacuum. The intrinsic viscosity in cyclohexanone at 25° C (C = 0) was 0.46 dl/g. The percentage of bound allylfluoride in the copolymer was 8.5 percent w.

For comparison the following experiment was carried out:

A suspension copolymerization of vinyl chloride with allylfluoride was carried out using the same procedure as above with the difference that a temperature of 65° C was maintained for 24 hours (instead of 52° C).

A polymer was obtained (in 32 percent yield) of intrinsic viscosity (cyclohexanone at 25° C, C = 0) of 0.43 dl/g.

The bound vinyl chloride from chlorine analysis was 94.5 percent by weight of bound vinyl chloride. However, no fluorine could be detected in this product (<0.01 percent F) which indicates that fluorine abstraction has taken place.

It is thus seen that upon raising the temperature to above the critical value of 55° C (in this case 65° C) the use of a peroxide catalyst leads to a product that contains practically no bound fluorine.

The above copolymer melts before decomposition, so that it can be processed into hard transparent products at 160°–180° C.

What is claimed is:

1. A process for producing an allyl fluoride copolymer, wherein allyl fluoride is copolymerized at a temperature not exceeding 55° C. in the presence of at least one free radical donor type catalyst selected from the group consisting of peroxides and hydroperoxides.

2. A process according to claim 1 wherein said copolymerization is effected in aqueous dispersion.

3. A process in accordance with claim 1 wherein said copolymerization is effected in an organic solvent selected from the group consisting of methanol, benzene and carbon tetrachloride.

* * * * *